INVENTOR.
Roland Philip Hammond
BY
ATTORNEY.

United States Patent Office 3,355,364
Patented Nov. 28, 1967

3,355,364
PLURAL CONDUIT FLASH FILM EVAPORATOR FOR DISTILLING AND CONDENSING SEA WATER
Roland Philip Hammond, Oak Ridge, Tenn., assignor to the United States of America as represented by the United States Atomic Energy Commission
Filed Sept. 22, 1965, Ser. No. 489,443
6 Claims. (Cl. 202—172)

ABSTRACT OF THE DISCLOSURE

The desalination of sea water or the distillation of other concentratable liquids is achieved by utilizing a flash evaporator employing vertically oriented condensers and flashing liquid streams. The liquid to be distilled is conveyed upwardly through the condenser, heated, and then directed in a downward direction as a film of heated liquid in close proximity to the outer surface of the condenser which is cooled by the ascending liquid. A temperature differential between the oppositely flowing liquid streams effects a vapor release from the descending stream and these vapors, in turn, contact and condense on the outer surface of the condenser to form a descending stream of distillate separate and distinct from the film. Also, heat transfer occurs between the oppositely flowing liquids to progressively heat the liquid ascending in the condenser as the descending liquid cools due to evaporation for providing a constant temperature differential over the vertical length of the condenser to assure that the vapor release from the descending liquid occurs along essentially the entire length of the condenser.

---

The present invention relates generally to evaporating systems for desalination of sea water and the like, and more particularly to flash evaporator plants wherein the condenser duct work and the flashing liquid stream are vertically oriented to permit use of special heat transfer techniques and to provide multi-stage evaporator constructions having no physical separation between stages.

World-wide interest in desalination of sea water to meet increased needs for water has resulted in extensive investigations in desalination systems. Monetary considerations play an important role in these investigations since desalination is practical only if it is capable of providing an economically feasible water supply. Consequently, any savings realized in the cost of the desalination equipment, such as evaporators, and the expense of operating such equipment is of considerable importance.

Previous flashing evaporator plants investigated for possible usage in desalination systems suffer several shortcomings or drawbacks from an engineering and cost point of view that detract from their desirability. For example, the designs of these previous flash evaporators are disadvantageous in that bulky and complex staging structures are utilized to minimize leakage of condensable vapors from stage to stage. Also, thermal resistances produced by de-entrainment devices, elevation of the boiling point due to submergence, and the long distances which the vapor must travel to the condenser, are sufficiently high in these previous evaporators as to affect the efficiency of the evaporator, thereby reducing the economy of the overall system.

The present invention aims to overcome or substantially minimize the above and other shortcomings or drawbacks by providing new and improved flash evaporators wherein increased thermodynamic efficiency, compactness, and simplicity are achieved to substantially reduce the manufacturing and operating costs. These and other advantages are attained by utilizing vertically oriented condenser conduits and flashing brine streams that are disposed in close proximity to one another to decrease the thermal resistances previously encountered. Also, the evaporator arrangements of the present invention may be constructed on-site by using conventional techniques and materials and may readily incorporate special heat transfer techniques to improve the efficiency of operation.

Accordingly, an object of the present invention is to provide improved flash evaporators at relatively low cost that are capable of efficient operation to increase the economic feasibility of seat water desalination.

Another object of the present invention is to provide multi-stage flash evaporators wherein no physical boundaries are utilized between successive stages.

Another object of the present invention is to provide improved evaporators having vertically oriented condensers and brine flashing streams.

A further object of the present invention is to provide an evaporator system incorporating brine heating in a simple extension of condenser conduits.

A still further object of the present invention is to orient brine flashing streams in close proximity to condensers in order to decrease thermal resistance and vapor travel.

A still further object of the present invention is to provide an improved evaporator having a brine flashing stream in the form of a rapidly moving thin layer for enhancing vapor release from the stream.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
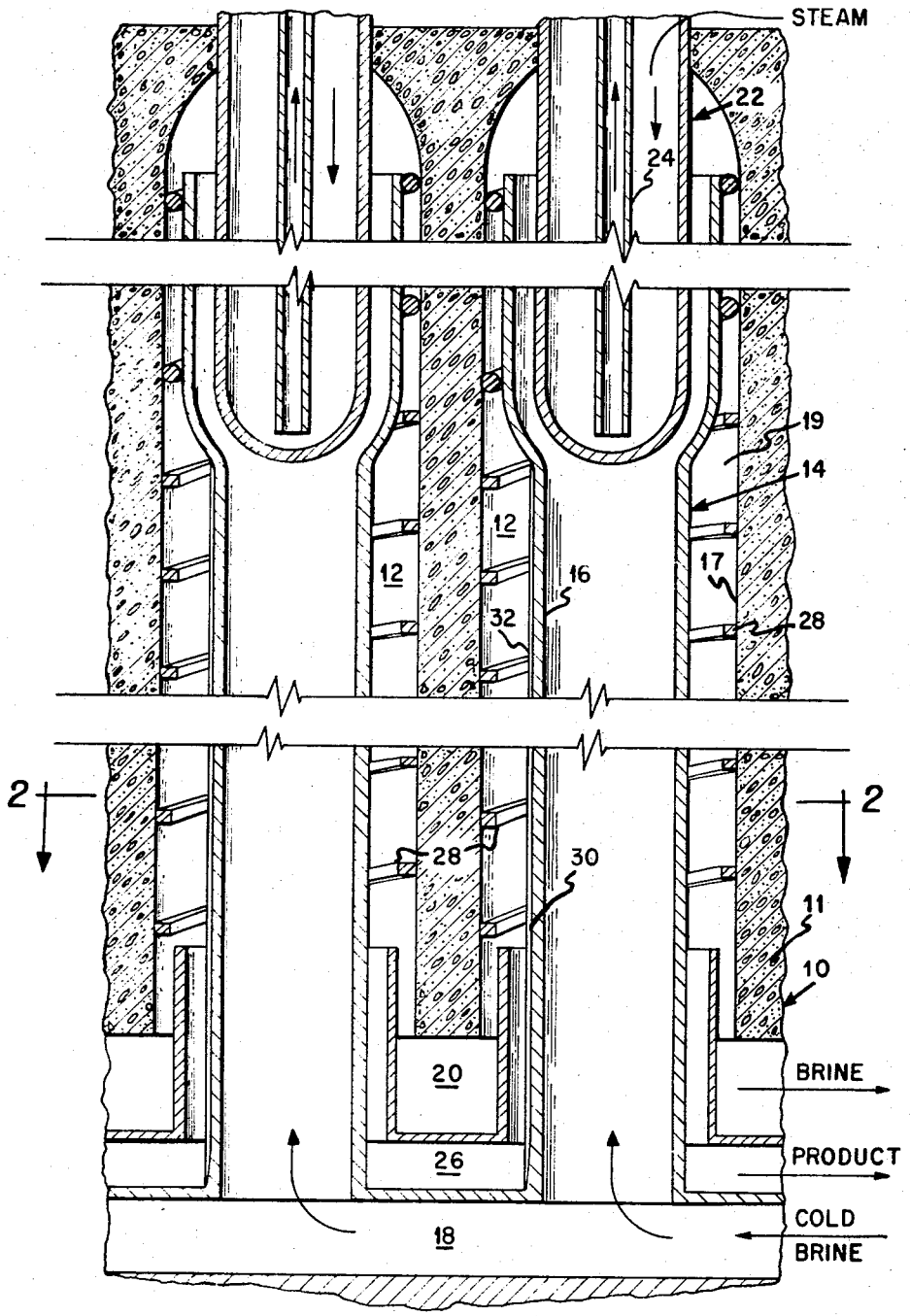
FIG. 1 is a broken elevational sectional view showing one form of the present invention.
Figure 2:
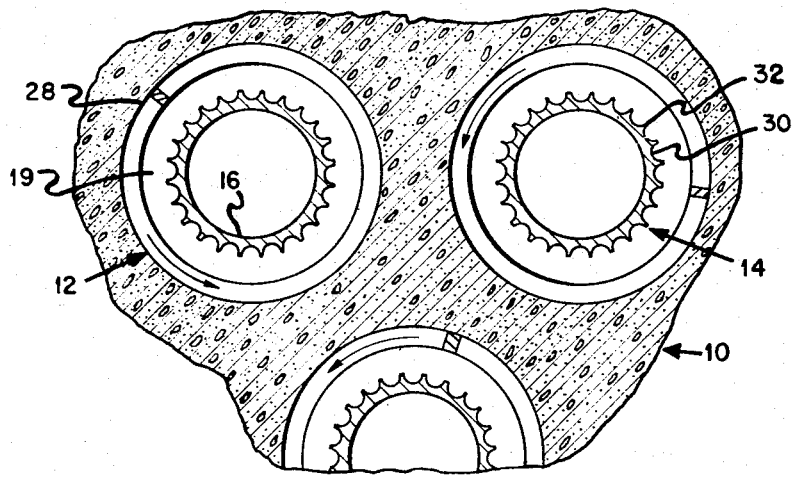
FIG. 2 is a fragmentary sectional plan view taken generally along line 2—2 of FIG. 1.
Figure 3:
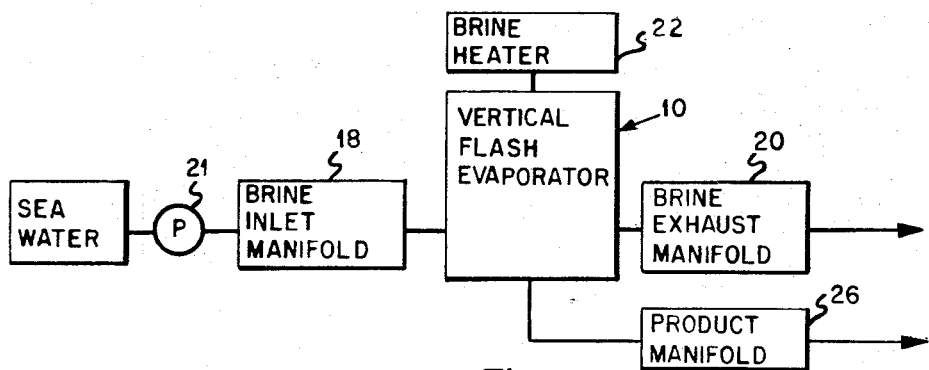
FIG. 3 is a diagrammatic representation of a sea water distillation plant incorporating the evaporator of the present invention.

Referring to FIGS. 1, 2, and 3, one form of flash evaporator constructed in accordance with the teachings of the present invention is generally indicated by numeral 10 and is shown comprising a housing 11 of prestressed concrete or any other suitable material and so constructed as to incorporate a plurality of vertically extending evaporating chambers 12. These chambers 12 are each preferably of a tubular configuration and extend from a location in the housing adjacent the uppermost surface thereof to and in registry with the lowermost surface of the housing. The vertical height of these chambers 12 may be of any desired length depending on the quantity of condensate desired from each evaporator chamber as will be discussed in detail below.

Within each evaporator chamber 12 there may be disposed a condenser 14 in the form of an elongate metal or other heat conductive conduit or tube 16 which may extend from a location below the opening into the chamber 12 to adjacent the uppermost end thereof as shown. The outer wall portions of tube 16 exposed to the housing surfaces defining the chamber walls 17 are preferably substantially equally spaced from the chamber walls about the entire circumference thereof. This spacing may be of any desired distance but may preferably be about one-half inch to minimize vapor travel and thermal resistance during condensation. The lower end of the tube 16 may be coupled to a suitable brine inlet manifold 18 disposed below the housing 10 while the upper end of the tube is open adjacent the upper end of the chamber 12 to enable brine flowing upwardly within the tube to spill over the upper end thereof and travel downwardly through the space or annulus 19 between the chamber walls 17 and the tube into a suitable brine discharge manifold 20.

Cold brine from a suitable source is introduced into the lower end of the tube 16 from the manifold 18 under a slight pressure from a suitable pressurizing means, e.g., pump 21, such that the brine is forced upwardly through the tube while filling the unoccupied volume therein as to be in contact with the tube walls to facilitate heat transfer between the upwardly flowing brine stream and the vapor of the downwardly flowing brine stream in the annulus 19. Adjacent the upper end of the tube 16 or at any other suitable location which may be external to the housing 10, a suitable brine heater is utilized to increase the temperature of the brine prior to its introduction into the annulus 19. Thus, with the vapor of the heated brine stream descending in the annulus in a heat exchange relationship with the brine within the tube, the temperature of the brine in the tube progressively increases as it travels up the tube. The heating of the brine prior to its introduction into the annulus further increases the temperature of the brine to provide a sufficient temperature differential between the upwardly and downwardly flowing brine streams to effect the release of condensables from the latter in the form of vapor which condenses on the outer surface of the tube 16 in a manner to be described below.

In order to heat the brine prior to its introduction into the annulus, a suitable heat source disposed in any desired location may be utilized. For example, as shown in FIG. 1 the brine heating may be achieved by positioning a brine heater 22 in the upper end of the tube 16. It may be desirable to flare the upper end of the tube 16 to permit the installation of a heater having a large surface area to facilitate the heating of the brine. The heat may be obtained by introducing steam from a suitable source into the heater and removing the resulting condensation through a centrally disposed tube 24. The use of the above described brine heater 22 is advantageous since interconnecting piping and its heat losses may be eliminated.

To achieve flash evaporation for the separation of "pure" water from the brine stream, the latter, after it has been further heated by the heater 22 or any other suitable heater, is preferably directed as a thin film or layer down the chamber walls 17. The thin layer of hot brine is preferably maintained in close spatial relationship to the outer surface of the condenser tube 16 but sufficiently spaced therefrom as to define a vapor zone therebetween. This vapor zone is preferably as narrow as possible to assure minimal resistance to vapor travel. For example, with the spacing between the condenser tube and the chamber walls being about one-half inch as pointed out above, the width of the vapor zone may be less than one-half inch. However, care should be exercised to maintain a sufficient spacing between the hot brine stream and the condenser walls to assure that the vapor zone is not interrupted and that the condensate formed on the outer surface of the condenser does not mingle with the hot brine.

As the thin layer of hot brine progresses down the chamber walls 17, portions of the brine flash off into a vapor consisting of condensable gases, e.g., water vapor, that traverse the vapor zone and condense on the colder tube 16. The condensed vapor, in turn, flows down the outer surface of the tube 16 into a suitable product collecting manifold 26 which may be disposed intermediate the brine manifolds 18 and 20. As mentioned above, heat transfer takes place between the vapor and the brine within the tube 16 to progressively heat the latter as the brine layer progressively cools due to evaporation. Consequently, with additional heat given to the brine by the heater 22 prior to its introduction into the annulus an essentially constant temperature differential is established between the oppositely flowing brine streams. Thus, brine flashing occurs over substantially the full length of the evaporator through the temperature gradiant established by the brine heater. Because the vapor from the flashing brine travels only a short distance to the condenser surface while being subjected to very little thermal resistance, the effective length of a "stage" is only a few inches with the pressure drop during this short distance being very slight. Thus, with effectively a large number of closely spaced stages provided over the full flashing range there is no need for physical partitions since the pressure drop per stage is very small.

In order to maintain the hot brine stream against the chamber walls during its descent, helically disposed guide vanes such as shown at 28 may be utilized to impart a spiral motion to the brine stream, which, in turn, imposes a centrifugal force upon the liquid to "hold" it against the chamber walls in the form of a film or thin layer. The guide vanes 28 are preferably arranged to allow the liquid to attain a high rotational velocity which together with its thin layer configuration promotes the release of vapor from the brine while minimizing bubble formation, two phase flow, or boiling point elevation due to submergence.

While the guide vanes 28 constitute the preferred manner for holding and forming the thin layer of liquid on the chamber walls, other means may be satisfactorily used, e.g., a thin layer of wire or plastic mesh positioned against or in close proximity to the chamber walls. The term "mesh" as used herein is intended to include any suitable structure capable of controlling the flow of water, such as, for example, steel or plastic wool, dimpled material, helically disposed wire turns, etc.

The condenser tube 16 may be in the form of a conventional smooth-surfaced tubulation, but it may be preferable to provide the tube with a fluted external surface having vertically oriented valleys or grooves 30 separated by ridges or peaks 32. The use of a fluted condenser tube is advantageous since greater heat transfer is achieved than with conventional tubing due to the fact that the structural relationship of the ridges 32 and the grooves 30 is such that the surface tension of the condensate causes the latter to drain away from the ridges 32 into the adjacent grooves 30 and thereby to expose condenser surfaces to vapor flow. Also, the grooves 30 provide a convenient means for transporting the condensate in a rapid manner to the product collecting manifold 26.

In the event the length of evaporator is such that condensate quantities become excessive for satisfactory drainage it may be desirable to provide suitable structure for removing excess condensate. Also, if desired, a staging and multiple effect may be achieved by vertically stacking a plurality of evaporators and utilizing the brine in the annulus 19 of one evaporator as the heating medium in the brine heater of the next lower evaporator. The condensate may be removed from the lower end of each evaporator.

While the evaporator housing 10 is described as being formed of concrete, it should be understood that any suitable structural material may be used, e.g., plastic, metal, etc.

In order to better understand the operation of the present invention a possible typical flash evaporator of the invention along with its operation is set forth below by way of example. This example is directed to an evaporator having a condenser tube 200 feet in length for convenience of description and, accordingly, could utilize additional structure to remove condensate prior to its traveling the full length of the tube.

Sea water is pumped from the manifold 18 into the bottom of the condenser tube 16, which may be about two inches in diameter, at a rate of about 2.6 pounds per second. The sea water enters the tube at about 80° F. with the temperature progressively increasing to about 180° during its upward travel due to heat transfer from the descending flashing brine stream, thus providing a temperature rise of about 0.5° F. per foot. Adjacent the top of the tube 16 or immediately after leaving the tube the sea water flows to a brine heater, e.g., heater 22, where heat is added to increase the temperature of the sea water up to about 190° F. This heated sea water is then introduced into the annulus 19 between the tube 16 and the chamber walls (the outer diameter of the annulus may be about 3 inches). The guide vanes 28 impart a rotational force upon descending brine to provide a smoothly revolving layer of brine on the chamber walls with the thickness of the layer being about 0.2 of an inch. Water evaporates from the surface of this rapidly moving brine layer, traverses the vapor zone, and condenses upon contacting condenser tube 16. Inasmuch as the condenser tube is everywhere about 10° F. colder than the adjacent descending brine and the thermal resistance in the vapor path is low, there is little tendency for the vapor to travel longitudinally. Also, the low flux of vapor from the brine surface and the centrifugal motion of the latter help minimize carry-over of brine droplets into the condensate. At the bottom of the evaporator the brine layer has cooled to about 90° F. and loses about 10 percent of its volume by evaporation. This 10 percent loss corresponds to production of water of about 2700 gallons per day.

Figure 4:
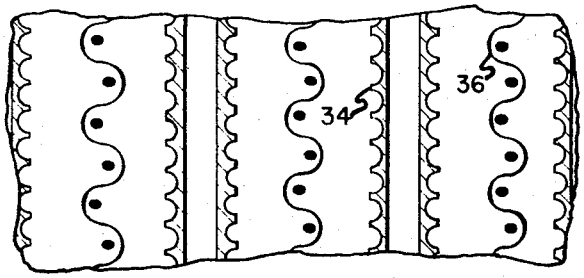
FIG. 4 is a fragmentary sectional plan view showing another form of the present invention.

In FIG. 4 another form of the present invention is shown which may comprise a plurality of upright condenser passageways or conduits 34 corresponding to condenser tube 16 (FIGS. 1 and 2) in function. These conduits 34, which may have fluted outer surfaces as shown, are preferably of rectangular configuration with the side walls of adjacent conduits in a parallel relationship to and laterally spaced from each other a distance of about one inch. The space intermediate each pair of these spaced-apart side walls contains an elongate vertically oriented wire screen or mesh 36 which corresponds to the chamber walls of the FIGS. 1 and 2 embodiment. The conduits 34 and meshes 36 may be supported in any suitable framework.

In operation cold brine within conduits 34 is progressively heated during its ascent and further heated at the top of the conduits in the same manner as the brine within tube 16 in the FIGS. 1–3 form. The heated brine in each conduit is then directed to an adjacent mesh 36 or, if desired, divided so that about half the brine is directed to the mesh 36 on one side of a conduit 34 and about half to another mesh 36 on the other or opposite side of the same conduit 34. The brine flow pattern is similar from each successive conduit 34, thus providing each mesh 36 with brine flow essentially equivalent to the full flow from any conduit 34. Also, if desired, a suitable manifold (not shown) may be disposed at the top of the conduits to collect and further heat the brine from the conduits 34. The heated brine may then be distributed in desired quantities to the various meshes 36. As the hot brine travels in a downward direction on each of the meshes 36 in the form of a thin layer, vapor is released from the brine on each vertical side of the mesh and condenses on surfaces of spaced-apart conduits 34 exposed to and separated by the mesh 36.

While the evaporator systems above described have been directed to the desalination of sea water, it should be understood that these systems may be advantageously used for the separation of contaminants from liquids other than sea water. Also, it should be understood that any desired number of evaporators may be used in a single distillation system to provide a desired quantity of water. For example, where a single evaporator three inches in diameter and about 100 feet tall may produce about 500 pounds per hour of product or about 1350 gallons per day, a closely packed bundle about eight feet in diameter would represent a capacity of about one million gallons a day.

It will be seen that the present invention sets forth unique evaporator plants of high efficiency and simple construction suitable for low-cost, automated production and maintenance.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

I claim:

1. A vertical flash evaporator for distilling sea water and other concentratable liquids, comprising an elongated, vertically oriented conduit for conducting a liquid to be distilled in an upward direction, heating means disposed adjacent to the uppermost end of said conduit for heating the liquid, a vertically oriented, elongated surface disposed in close proximity to and exposed to outer surface portions of said conduit for conducting said liquid in a downward direction subsequent to the heating of the liquid and the conduction thereof through said conduit with said downwardly directed flow of liquid being at a temperature greater than that of the conduit and the liquid therewithin for progressively heating the liquid as it is conducted through the conduit due to the temperature differential between the oppositely flowing liquids, and flow liquid retarding means contiguous to the vertical surface along essentially the entire length thereof for forming and maintaining the downwardly directed flow of liquid in the form of a film to define a flashing volume between the film and the relatively cooler outer surface portions of the conduit for causing a portion of the liquid forming the film to vaporize and condense on said outer surface portions of the conduit and define a discrete downwardly directed flow of condensate thereon.

2. The vertical flash evaporator as claimed in claim 1, wherein the evaporator includes a housing having a tubular, vertically extending aperture therein with wall surfaces of the housing defining the aperture providing said vertical surface, and wherein said conduit is disposed in the aperture with said outer surface portions of the conduit being spaced from said wall surfaces for providing a liquid receiving annulus therebetween.

3. A vertical flash evaporator as claimed in claim 2, wherein said flow liquid means comprises helically disposed guide vanes disposed against the wall surfaces of said housing.

4. A vertical flash evaporator as claimed in claim 2, wherein said outer surface portions of the conduit are substantially defined by vertically oriented, laterally extending ridges circumferentially spaced apart from each other and interconnected by laterally inwardly disposed surfaces.

5. A vertical flash evaporator as claimed in claim 1, wherein the conduit is of a rectangular configuration, said outer surface portions are disposed in parallel planes, and wherein said vertical surface is disposed in a plane parallel to the outer surface portions.

6. A vertical flash evaporator as claimed in claim 5, wherein a plurality of conduits are spaced apart from one another with the outer surface portions of one of said conduits and the outer surface portions of another of said conduits being disposed in parallel planes, said vertical surface comprises a mesh, and wherein a plurality of meshes are spaced apart from one another in parallel planes with one of said meshes disposed intermediate each pair of adjacently disposed conduits.

References Cited

UNITED STATES PATENTS

| | | | |
|---|---|---|---|
| 2,159,303 | 5/1939 | Waterman et al. | 203—72 X |
| 2,447,746 | 8/1948 | Ferris et al. | 202—185.2 X |
| 2,803,589 | 8/1957 | Thomas | 203—11 |
| 3,004,590 | 10/1961 | Rosenblad | 159—13 |
| 3,161,574 | 12/1964 | Elam | 203—11 X |
| 3,240,683 | 3/1966 | Rodgers | 202—173 |
| 3,244,601 | 4/1966 | Diedrich | 203—10 X |
| 3,284,318 | 11/1966 | Coanda et al. | 203—11 X |
| 3,292,683 | 12/1966 | Buchi et al. | 202—187 X |
| 3,288,686 | 11/1966 | Othmer | 203—11 |

FOREIGN PATENTS 381,904    9/1923    Germany.

WILBUR L. BASCOMB, Jr., *Primary Examiner.*

NORMAN YUDKOFF, *Examiner.*

F. E. DRUMMOND, *Assistant Examiner.*